Patented Feb. 9, 1954

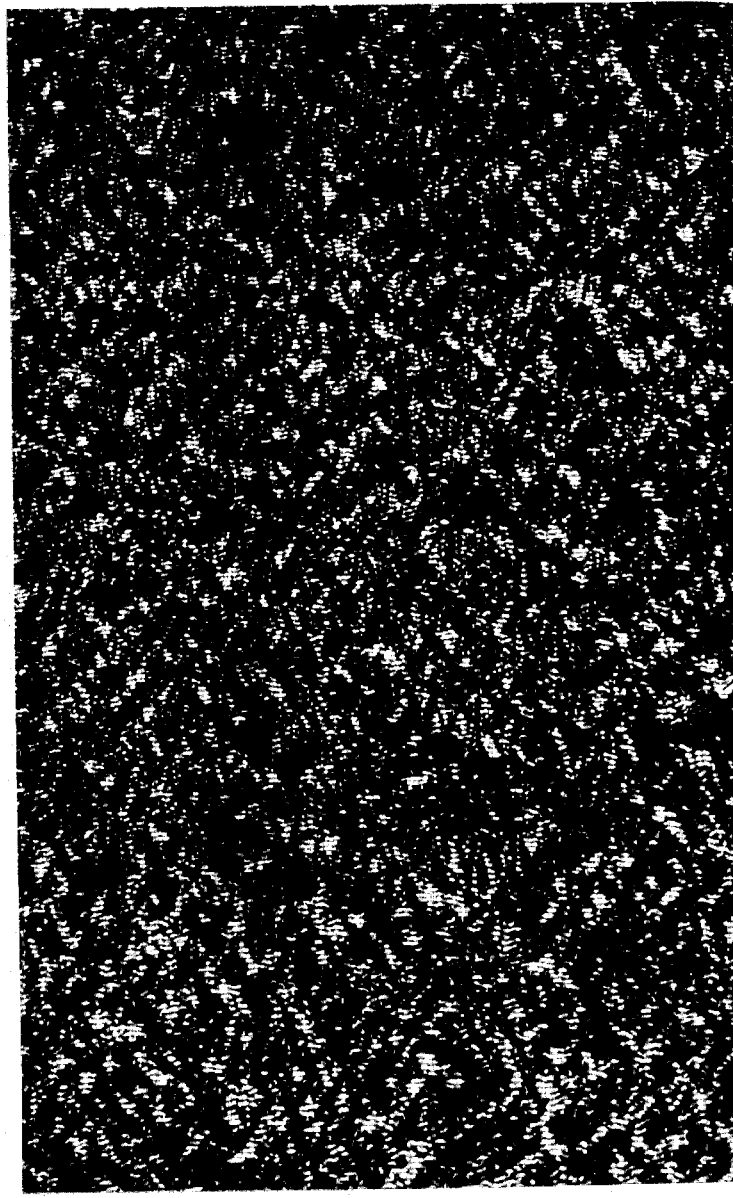

2,668,799

UNITED STATES PATENT OFFICE 2,668,799

PRODUCTION OF A FLUORESCENT AND IRIDESCENT WRINKLE-FINISH COATING CONTAINING A HYDROUS IRON OXIDE AS PIGMENT

William A. Waldie, Oakwood, Ohio, assignor to New Wrinkle, Inc., Dayton, Ohio, a corporation of Delaware Application August 1, 1949, Serial No. 107,974

2 Claims. (Cl. 260—22)

This invention relates to new and novel coating compositions. More particularly, it relates to coating compositions of unusual beauty and color effects. Still more particularly it relates to wrinkle compositions.

The customary methods of preparing wrinkled paint or varnish films, generally involves the use of what are known as wrinkling oils and/or wrinkling resins.

Pigmentation involves essentially high hiding power whereby opaque appearance is secured without sacrificing resistance to deterioration due to exposure to light and the elements.

Heretofore the methods of preparing multi-tone finishes or multi-tone effects have required two or more paint products, or at least two separate and distinct finishing operations or paint mixtures incorporating powdered metals in addition to the normal pigmentation.

It is an object of the present invention to overcome the limitations and disadvantages of the above described methods.

It is a further object of this invention to provide an improved method of producing a multi-toned finish.

It is another object of the present invention to produce from a single liquid paint a wrinkle finish having a multi-toned effect.

It is a still further object of this invention to produce from a single liquid paint which does not contain metals a wrinkle finish having iridescent properties.

It is also an object of the present invention to produce an iridescent wrinkle finish in which a single coating composition is applied uniformly to a base.

It is another object of the present invention to produce wrinkle coating compositions for producing the improved finishes.

It is also a further object of this invention to provide an iridescent wrinkle coating composition which has color, stability and durability.

Various other objects and advantages will be apparent to one skilled in the art as the following description proceeds.

According to the present invention a coating composition comprising any suitable wrinkle base, such as wrinkling alkyd or wrinkling varnish base, and a hydrous iron oxide pigment is applied to the material to be coated in a uniform manner such as by a fine spray, brushing, dipping, and the like. The coating is then dried either in air or by force drying methods to a uniform or non-uniform wrinkle texture as desired.

Wrinkling bases have heretofore been made in the nature of varnishes and included in the formulas drying oils, resins, driers and volatile thinners. The drying oil is usually one that shows a wrinkling tendency upon drying and includes blown or unblown chinawood oil, blown linseed oil, perilla oil, and so forth, maleic anhydride treated vegetable oils, and the like.

The resins utilized in such wrinkling finishes include the more common varnish gums, such as Congo, kauri, cumar, modified phenol aldehyde resins, and so forth, which may be generally termed "wrinkle finish resins," to distinguish them from such substances as rosin which when used in large amounts act as wrinkle inhibitors.

The driers utilized are the usual metallic driers employed in varnish manufacture, for example, the oxides, linoleate and naphthenate compounds, such as manganese oxide, lead oxide, cobalt linoleate, cobalt naphthenate, and the like.

The primary purpose of the thinners in any coating composition is to afford a solvent or dispersing medium for the other ingredients and to provide a means for applying the mixture to a surface in a thin film. Preference is given to thinners of high volatility, such as toluol, xylol, light naphtha, and so forth.

Wrinkle bases are also prepared from alkyd resins and vegetable oil modified alkyd resins. Typical alkyd resins are prepared from aliphatic dibasic acid such as phthalic anhydride, maleic acid, and maleic anhydride and polyhydric alcohols such as glycols, glycerin, sorbital, glycol ethers, and the like.

These resins may be modified by formation in the presence of vegetable oils such as castor oil, tung oil, varnish linseed oil, oiticica, soya bean, and equivalent oils.

The primary pigment utilized in this invention is a hydrous ferric-ferrous oxide or similar hydrous ferric oxide. This pigment as explained in Patent No. 2,335,760 may be prepared by heating $FeCl_3.6H_2O$ with sodium sulfate $Na_2SO_4$ at 70° F. in an aqueous solution and adding slowly during a 15 minute cycle with agitation $Na_2CO_3$ solution to a final pH of 7.2. The precipitated oxide is washed sulfate free.

This hydrous iron oxide is a yellowish green pigment and is compatible with numerous other pigments useful for shading, as for example, cobalt blue. The pigment may be used in a wide range of concentrations, depending upon the depth of green desired, and generally is added in concentrations of from .5 to 5%.

The incorporation of shading pigment, it has been found, does not impair the iridescent character of the coating. On the other hand, while it may be desirable to add powdered metals, such as aluminum and zinc, to the composition to impart other than pigment properties, these metal powders apparently impair instead of enhance the iridescent character of the coating and impart a chalky cast which detracts from the beauty of the basic coating composition.

The coating composition can be made up in a great variety of ways. As typical examples of formulations and procedures according to my invention, but without thereby limiting myself to the specific details of procedure and proportions indicated, the following illustrative examples are given:

Example I

| | |
|---|---|
| Modified phenol-formaldehyde resin (Amberol F7 or Beckacite) _____pounds__ | 100 |
| Lead Acetate _____do____ | 5-9 |
| China-wood oil _____gals__ | 18 |
| Linseed oil heat bodied to a Z-4 body_gals__ | 2 |
| Cobalt naphthenate 6% metal _____gals__ | ½ |
| Thinner (the thinner consisting of, for example, 24 gals. of toluol and 10 gals. of solvent naphtha) _____gals__ | 34 |

In the foregoing varnish formula, the synthetic resin employed is the oil soluble phenol type. Typical formulae and the method of making this resin are shown in Patents 1,623,901 and 1,632,113.

In preparing this varnish composition 50# of resin and all of the China-wood oil are heated together to approximately 540° F. and the batch then removed from the fire. The temperature will rise slightly, but as soon as it has fallen again to 540° F. the vessel is put back on the fire and the temperature held at 540° F. until the batch shows a slight string from a stirring rod.

The lead acetate is then added to check polymerization and directly thereafter the additional quantity of resin and the linseed oil are added. The entire batch is then heated quickly with stirring to approximately 450° F., after which it is allowed to cool down to approximately 350° F., whereupon the thinner and cobalt drier are added.

The composition resulting from the above procedure may be further compounded with such fillers or filler-pigments as titanium oxide, asbestine, silica, silex, whiting china clay, diatomaceous earth in addition to the hydrous iron oxide color pigment.

The pigment may be ground directly into the wrinkling vehicle or may be prepared in paste form by grinding the pigment with an oil or a varnish.

It is preferable that the vehicle have wrinkling character. However, a non-wrinkling vehicle may be used provided that the amount and/or character of the vehicle in the paste is not such as to eliminate the wrinkling characteristics of the final composition.

A pigment paste may be prepared having the following composition:

| | |
|---|---|
| Hydrous iron oxide pigment _____pounds__ | 8 |
| Asbestine _____do____ | 4 |
| Linseed oil _____do____ | 3-8 |
| Toluol _____gals__ | 1 |

A typical coating composition is prepared from the above mixtures as follows:

| | |
|---|---|
| Pigment paste _____pounds__ | 2-3 |
| Varnish vehicle _____gals__ | 1 |

In compounding wrinkle compositions using the above varnish and paste, the texture can be modified by incorporating various amounts of the paste. The amount of paste which can be incorporated in the varnish before the film loses its wrinkling character depends upon the particular inert pigment used in making the paste.

Example II

A wrinkling alkyd may be used as the base vehicle as follows:

A pigment color paste may be prepared by roll grinding as follows:

| | Pounds |
|---|---|
| Hydrous iron oxide _____ | 8 |
| Tung oil modified alkyd resin of glyceryl-phthalic acid type _____ | 16 |

This color pigment base may then be mixed with a clear mixing wrinkle, for example, of the same resin as used in formation of the paste. The following is a typical composition:

| | |
|---|---|
| Color paste _____pounds__ | 3 |
| Tung oil modified alkyd resin_____gals__ | 4 |
| Cobalt naphthenate 6% metal_____ozs__ | 2 |
| Toluol _____gals__ | 1 |

The iridescent character of the coating is illustrated in Figure 1, wherein is given a reproduction of a photograph of substantially the size of the panel photographed.

This panel is a metal base coated with the final coating composition of Example II. The coating 10 is a continuous film applied by spraying. The iridescence is shown scattered over the surface and is indicated by 11. The panel itself exhibits multi-tone green color in addition to the indicated iridescence.

It will be understood that while there have been given herein certain specific examples of the practice of this invention, it is not intended thereby to have this invention limited to or circumscribed by the specific details of materials, proportions, or conditions herein specified, in view of the fact that this invention may be modified according to individual preference or conditions without necessarily departing from the spirit of the disclosure and the scope of the appended claims.

I claim:

1. A wrinkle coating composition which is iridescent upon application and drying to a wrinkle finish, said wrinkle coating composition consisting of a pigment paste dispersed in a drying oil-resin vehicle, said pigment paste consisting of the following constituents in the approximate proportions; hydrous iron oxide 8 pounds, said hydrous iron oxide being prepared by heating hydrous ferric chloride containing six units of water per molecule with sodium sulphate at 70° F. in an aqueous solution and adding sodium carbonate solution slowly during a 15-minute cycle to adjust the pH to 7.2 and washing the resultant precipitated oxide free of sulphate. China-wood and oil modified glyceryl phthalic anhydride resin 16 pounds; said vehicle consisting of China-wood oil modified glyceryl phthalic anhydride resin 4 gallons, cobalt naphthanate 2 oz. and toluol 1 gallon; said pigment paste and vehicle being in the proportionate amounts of approximately 2 to 3 pounds of the pigment paste to 1 to 5 gallons of the drying oil-resin vehicle.

2. A wrinkle coating composition which is iridescent upon application and drying to a wrinkle finish, said wrinkle coating composition consisting of a pigment paste dispersed in a drying oil-resin vehicle, said pigment paste consisting of the following constituents in the approximate proportions; 8 pounds hydrous iron oxide, said hydrous iron oxide being prepared by heating hydrous ferric chloride containing six units of water per molecule with sodium sulphate at 70° F. in an aqueous solution and adding sodium carbonate solution slowly during a 15-minute cycle to adjust the pH to 7.2 and washing the resultant precipitated oxide free of sulphate, 16 pounds of a synthetic resin selected from the group consisting of China-wood oil modified glyceryl phthalic anhydride resin and drying oil modified phenol-formaldehyde resin, said vehicle consisting of 4 gallons of a resin selected from the group consisting of China-wood oil modified glyceryl phthalic anhydride resin and drying oil modified phenol-formaldehyde resin, cobalt naphthanate 2 oz. and toluol 1 gallon; said pigment paste and vehicle being in the proportionate amounts of approximately 2 to 3 pounds of the pigment paste to 1 to 5 gallons of the drying oil resin vehicle.

WILLIAM A. WALDIE.

References Cited in the file of this patent

UNITED STATES PATENTS

| Number | Name | Date |
|---|---|---|
| 1,954,835 | Stauffer | Apr. 17, 1934 |
| 2,268,002 | Waldie | Dec. 30, 1941 |
| 2,335,760 | Hucks | Nov. 30, 1943 |
| 2,455,540 | Waldie | Dec. 7, 1948 |
| 2,541,642 | Downs et al. | Feb. 13, 1951 |

OTHER REFERENCES

"Protective and Decorative Coatings," by Mattiello, vol. 2 page 291.